United States Patent Office 3,275,705  
Patented Sept. 27, 1966

3,275,705  
DEHYDROGENATION CATALYST  
E. O. Box, Jr., Bartlesville, Okla., assignor to Phillips Petroleum Company, a corporation of Delaware  
No Drawing. Filed June 14, 1965, Ser. No. 463,853  
9 Claims. (Cl. 260—683.3)

This invention relates to the use of novel catalyst systems for the dehydrogenation of hydrocarbons.

In another aspect this invention relates to the use of cuprous sulfide as an active paraffin dehydrogenation catalyst. In another aspect this invention relates to the utilization of supported cuprous sulfide for the conversion of hydrocarbons. In a still further aspect of this invention, there is provided a method for improving the dehydrogenation of paraffins with cuprous sulfide by carrying out the dehydrogenation of same in the presence of added hydrogen sulfide.

While many active dehydrogenation catalysts are known for $C_4$ and higher paraffin hydrocarbons, these catalysts are not usually suitable for dehydrogenation of propane and/or ethane.

The thermodynamics of the dehydrogenation of these two paraffins is such that considerably higher temperatures are required than are required for dehydrogenation of the higher paraffins. At these higher temperatures the usual dehydrogeneration catalysts cause cracking and other undesirable side reactions and as a result low yields of the desired olefins and high yields of coke and undesirable reaction products are obtained. In other cases the catalysts lose activity rapidly at the elevated temperatures because of decrease in surface area and related catalytic properties and therefore low yields of the desired olefins are obtained.

The present invention is concerned with the use of catalysts in the dehydrogenation of ethane and propane. It is thus an object of the present invention to provide a novel catalyst system containing cuprous sulfide. It is a further object of this invention to utilize cuprous sulfide, optionally supported on alumina or other materials not having protonic acidity as an active paraffin dehydrogenation catalyst. It is a still further object of this invention to improve the dehydrogenation of paraffins with cuprous sulfide by carrying out the dehydrogenation process in the presence of added hydrogen sulfide.

Other aspects, objects, advantages and features of the invention will be readily apparent to those skilled in the out from the following description and appended claims.

In accordance with the present invention I have found that cuprous sulfide is an active dehydrogenation catalyst for propane and ethane. I have further found that when the cuprous sulfide is mixed with a support such as alumina is such a manner that the cuprous sulfide is 10 to 75 weight percent of the mixture that the activity of the catalyst system is further increased. In addition, although this catalyst can be used for short periods without adding hydrogen sulfide, it is further within this invention disclosed to be desirable to add hydrogen sulfide continuously during the dehydrogenation period or to start such hydrogen sulfide addition within 1 to 5 hours after the start of the dehydrogenation period.

Although the cuprous sulfide catalyst can be used as such, it is more desirable to mix it with a support not having protonic acidity, such as alumina, magnesia, titania and the like. Of the supports not having protonic acidity known to the industry, alumina is preferred. The temperature of dehydrogenation is selected from a range of 1100 to 1500° F. Obviously, the temperature in any given instance should be high enough to correspond to a substantial equilibrium concentration of the desired product, but should not be so high as to induce excessive side reactions or to injure the catalyst. A pressure in the range of 0.1 to 3 atmospheres can be employed, and the reaction can be carried out at a total space velocity, in volumes of hydrocarbon plus $H_2S$ as a gas (when used) per volume of catalyst per hour of 100 to 2000. The $H_2S$ to paraffin mol ratio can be in the range 0:1 to 10:1. For practical operations, operating conditions are usually selected to give a 10 percent to 40 percent conversion per pass. The following example is presented to further illustrate the invention:

*Example*

Propane was dehydrogenated under the following conditions, with the indicated results:

| Run No. | 1 | 2 | 3 | 4 | 5 |
|---|---|---|---|---|---|
| Catalyst | $Cu_2S$ | $Cu_2S$—MgO | $Cu_2S$—$Al_2O_3$ | $Cu_2S$—$Al_2O_3$ | $Cu_2S$—$Al_2O_3$ |
| Temperature, F | 1,200 | 1,200 | 1,210 | 1,210 | 1,220 |
| Pressure | Atmospheric | Atmospheric | Atmospheric | Atmospheric | Atmospheric |
| Total Space Velocity, v./v./r | 800 | 800 | 470 | 560 | 800 |
| $H_2S/C_3H_8$, mol | 0.16 | 0.16 | | 0.20 | 0.16 |
| Time in Run, hr | 3.5 | 2.25 | 2.75 | a 4.25 | 1.0 |
| $C_3H_8$ Conversion, mol percent | 10.6 | 14.0 | 40.0 | 40.0 | 53.5 |
| $C_3H_6$ Yield, mol percent: | | | | | |
| Per pass | 4.8 | 6.6 | 30.0 | 27.8 | 39.8 |
| Ultimate | 45.0 | 47.0 | 75.0 | 69.5 | 74.5 | a Continuation of Run 3, with $H_2S$ added immediately following the 2.75-hour sample.

The catalysts used in these runs were 1/8-inch pellets formed from the following.

Run 1: Reagent grade cuprous sulfide.

Run 2: A 50–50 mixture of reagent grade cuprous sulfide and magnesium oxide.

Runs 3 and 4: A 50–50 mixture of reagent grade cuprous sulfide and an alumina having a surface area of 282 m.$^2$/g.

Run 5: A 50–50 mixture as in Runs 3 and 4, except that the mixture was ball-milled for one hour prior to pelleting.

These data show that dehydrogenation is obtained with cuprous sulfide alone or supported on magnesia, and that excellent yields of propylene are obtained when the cuprous sulfide is supported on alumina.

The ethylene and/or propylene formed are separated from the unconverted hydrocarbon, which is returned to the dehydrogenation unit. Utility of these olefins for chemical synthesis and polymerization reactions is well known to the industry.

The term "protonic acidity" refers to the protonic acid content of catalysts as determined by base exchange with ammonium acetate solution followed by pH measurement. The procedure for determination of this value is described by Holm et al., Journal of Physical Chemistry, vol. 63, pp. 129–133 (1959).

Reasonable variations and modifications are possible within the scope of this disclosure without departing from the spirit and scope thereof.

I claim:

1. A process for the dehydrogenation of a gaseous hydrocarbon selected from the group consisting of propane and ethane and mixtures thereof which comprises contacting the gaseous hydrocarbon at an elevated temperature selected from the range of 1100 to 1500° F. with a cuprous sulfide catalyst.

2. The process according to claim 1 wherein the cuprous sulfide is supported on alumina.

3. The process according to claim 1 wherein hydrogen sulfide is added to the reaction.

4. A process for the dehydrogenation of ethane comprising subjecting said ethane to a conversion temperature selected from the range of 1100–1500° F. in the presence of a cuprous sulfide catalyst.

5. The process according to claim 4 wherein the cuprous sulfide is present on an alumina support.

6. A process for the dehydrogenation of propane comprising subjecting said propane to a conversion temperature selected from the range of 1100–1500° F. in the presence of a cuprous sulfide catalyst.

7. The process according to claim 6 wherein the cuprous sulfide is present on an alumina support.

8. A process for the dehydrogenation of a mixture of propane and ethane comprising subjecting said mixture to a conversion temperature selected from the range of 1100–1500° F. in the presence of a cuprous sulfide catalyst.

9. The process according to claim 8 wherein the cuprous sulfide is present on an alumina support.

References Cited by the Examiner

UNITED STATES PATENTS

| | | | |
|---|---|---|---|
| 2,629,753 | 2/1953 | Frevel et al. | 260—683.3 X |
| 2,747,968 | 5/1956 | Pigache | 23—2.1 |
| 3,079,223 | 2/1963 | Lewis | 23—3.1 |

DELBERT E. GANTZ, *Primary Examiner.*

G. E. SCHMITKONS, *Assistant Examiner.*